United States Patent
Fujimoto et al.

(10) Patent No.: US 9,639,736 B2
(45) Date of Patent: May 2, 2017

(54) APPARATUS FOR AND METHOD OF PROCESSING IMAGE AND STORAGE MEDIUM

(71) Applicant: DAINIPPON SCREEN MFG. CO., LTD., Kyoto (JP)

(72) Inventors: Hiroki Fujimoto, Kyoto (JP); Jiro Tsumura, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 112 days.

(21) Appl. No.: 14/065,484

(22) Filed: Oct. 29, 2013

(65) Prior Publication Data

US 2014/0153812 A1    Jun. 5, 2014

(30) Foreign Application Priority Data

Nov. 30, 2012    (JP) ................. 2012-263822

(51) Int. Cl.
     *G06K 9/00*      (2006.01)
(52) U.S. Cl.
     CPC ................. *G06K 9/00147* (2013.01)
(58) Field of Classification Search
     None
     See application file for complete search history.

(56) References Cited

U.S. PATENT DOCUMENTS

| | | | | |
|---|---|---|---|---|
| 5,627,908 A | * | 5/1997 | Lee | G01N 15/1475 382/128 |
| 7,469,056 B2 | * | 12/2008 | Ramm | G01N 15/1475 382/128 |
| 7,764,822 B2 | * | 7/2010 | Ramm | G01N 15/1475 382/129 |
| 9,292,730 B2 | * | 3/2016 | Fujimoto | G06K 9/00147 |
| 2002/0186875 A1 | * | 12/2002 | Burmer | G06K 9/66 382/133 |
| 2004/0027618 A1 | * | 2/2004 | Nakamura | H04N 1/4097 358/3.26 |

(Continued)

FOREIGN PATENT DOCUMENTS

| | | | | |
|---|---|---|---|---|
| AU | 2003230069 A1 | * | 11/2003 | ......... G01N 15/1475 |
| CA | CN 1605843 A | * | 4/2005 | ......... G01N 21/6452 |

(Continued)

OTHER PUBLICATIONS

English translation of Notification of Reasons for Refusal (Office Action) drafted Sep. 16, 2014 in corresponding Japanese Patent Application No. JP 2012-263822.

*Primary Examiner* — Iman K Kholdebarin
(74) *Attorney, Agent, or Firm* — Ostrolenk Faber LLP

(57) ABSTRACT

An image processing apparatus displays an object adopted and an object not adopted by an adoption/non-adoption process in a distinguishable manner. A user designates an object whose adoption/non-adoption result is desired to be reversed among the objects displayed by the image processing apparatus. The image processing apparatus changes an allowable range stored in a storage part so that the adoption/non-adoption result of the designated object is reversed. That is, the user views the adoption/non-adoption result of the objects to change the allowable range of a parameter so that the adoption/non-adoption result becomes proper. This makes the allowable range of the parameter for use in the adoption/non-adoption process proper with ease.

17 Claims, 11 Drawing Sheets

(56) References Cited

U.S. PATENT DOCUMENTS

| | | | | |
|---|---|---|---|---|
| 2004/0048396 | A1* | 3/2004 | Nellis | G06F 19/20 436/514 |
| 2004/0253738 | A1* | 12/2004 | Shackney | G01N 15/1475 436/63 |
| 2005/0109938 | A1* | 5/2005 | Miyai | G01N 23/2251 250/311 |
| 2005/0207633 | A1* | 9/2005 | Arini | G01N 15/1475 382/133 |
| 2006/0204071 | A1* | 9/2006 | Ortyn | G01J 3/2889 382/133 |
| 2006/0233434 | A1* | 10/2006 | Hamamatsu | G06K 9/2027 382/149 |
| 2006/0257013 | A1* | 11/2006 | Ramm | G01N 15/1475 382/133 |
| 2009/0231469 | A1 | 9/2009 | Kato | 348/234 |
| 2010/0169811 | A1* | 7/2010 | Yamada | G01N 15/1475 715/764 |
| 2011/0299759 | A1* | 12/2011 | Shi | G03F 1/84 382/144 |
| 2012/0033064 | A1* | 2/2012 | Yamada | G02B 21/0004 348/79 |
| 2012/0147010 | A1* | 6/2012 | Schmidt | G06F 19/321 345/440 |
| 2013/0002847 | A1* | 1/2013 | Zahniser | G01N 15/1475 348/79 |
| 2013/0101199 | A1* | 4/2013 | Alexandrov | G06K 9/0014 382/133 |

FOREIGN PATENT DOCUMENTS

| | | | |
|---|---|---|---|
| CN | 1605843 A | * | 4/2005 |
| EP | 000333921 A2 | * | 9/1989 |
| JP | 09-212673 | | 8/1997 |
| JP | 09212673 A | * | 8/1997 |
| JP | 2003-108996 | | 4/2003 |
| JP | 2005-116768 | | 4/2005 |
| JP | 2005-525550 | | 8/2005 |
| JP | 2006-300517 | | 11/2006 |
| JP | 2009-245429 | | 10/2009 |
| JP | 2012-37432 | | 2/2012 |
| WO | WO 03/095986 A1 | | 11/2003 |

* cited by examiner

| Number | Reason For Non-Adoption |
|---|---|
| 1 | Area (diameter) is greater than upper limit. |
| 2 | Area (diameter) is less than lower limit. |
| 3 | Optical Density is higher than upper limit. |
| 4 | Optical Density is lower than lower limit. |
| 5 | Volume is greater than upper limit. |
| 6 | Volume is less than lower limit. |
| 7 | Circularity is lower than lower limit. |

APPARATUS FOR AND METHOD OF PROCESSING IMAGE AND STORAGE MEDIUM

BACKGROUND OF THE INVENTION

Field of the Invention

The present invention relates to an image processing apparatus and an image processing method which perform an adoption/non-adoption process for classifying objects included in an image as adopted or as not adopted and which change the allowable range of a parameter for use in the adoption/non-adoption process, and to a storage medium having an image processing program stored therein.

Description of the Background Art

A screening which narrows down compounds serving as candidates for medical and pharmaceutical products is performed in the course of research and development of the medical and pharmaceutical products. An example of the screening includes the steps of: preparing a plurality of culture solutions into which biological cells are put; adding compounds to the culture solutions while changing various conditions to cultivate the cells; and narrowing down the compounds serving as candidates for medical and pharmaceutical products, based on the culture states of the cells.

In such a screening, a reagent has been hitherto used for the assessment of the culture states of the cells. Specifically, a reagent is applied to the cells to cause the fluorescence reaction of specific molecules in the cells. The culture states of the cells are judged by measuring the fluorescence intensity of the specific molecules in the cells. This method, however, has required the costly reagent, and also has required much time for the fluorescence reaction. In addition, this method has not been capable of observing changes in the same cell with time because the reagent destroys cell walls.

In recent years, three-dimensional culture such that cells are cultivated in three dimensions has been performed to investigate the effects of medical and pharmaceutical products in an environment closer to that in a living body. An important object to be observed in such three-dimensional culture is the state of spheroids which are three-dimensionally aggregated cell clumps. The aforementioned method of measuring the fluorescence is not suitable for the observation of the cell clumps.

To solve such problems, an attempt has been made in recent years to develop an apparatus for observing the culture states of cells by photographing the cells at a high resolution without using any reagent. This apparatus photographs a well plate having a plurality of depressions or wells for culture at predetermined time intervals to clip images of each of the wells from the resultant photographed images. The culture states of the cells in each well are assessed by comparing and analyzing the clipped images with time.

The aforementioned apparatus measures parameters such as the area and optical density of objects corresponding to the cells in the images when classifying the culture states of the cells as adopted or as not adopted from the resultant images. Software in the apparatus judges whether to adopt the cells or not, based on whether the measurement values are within an allowable range or not. Appropriate setting of the allowable range of each of the parameters is important to increase the accuracy of the judgment as to whether to adopt the cells or not using the software. When a user is enabled to change the allowable range of each of the parameters to any value, the result of the judgment as to whether to adopt the cells or not using the software is caused to approach the result of the judgment as to whether to adopt the cells or not through a user's visual check.

A conventional apparatus which enables a user to change the details of image processing is disclosed, for example, in Japanese Patent Application Laid-Open No. 9-212673 (1997).

A large number of parameters are used for the judgment as to whether to adopt the cells or not. It is a difficult operation for a user unskilled in image processing to appropriately select a parameter with an allowable range to be changed from the large number of parameters to adjust the upper limit or the lower limit of the allowable range to an appropriate value.

SUMMARY OF THE INVENTION

It is therefore an object of the present invention to provide a technique capable of making the allowable range of a parameter for use in an adoption/non-adoption process proper with ease in an image processing apparatus and an image processing method which classify objects included in an image as adopted or as not adopted and in a storage medium having an image processing program stored therein.

According to a first aspect of the present invention, an image processing apparatus comprises: a storage part for storing therein allowable ranges of parameters for use in an adoption/non-adoption process for classifying an object included in an image as adopted or as not adopted; an object extraction part for extracting a plurality of objects from the image; an adoption/non-adoption processing part for determining that an object having the parameters within the allowable ranges is adopted and that an object having at least one of the parameters outside a corresponding one of the allowable ranges is not adopted among the plurality of objects; a display output part for displaying the object adopted and the object not adopted by the adoption/non-adoption processing part in a distinguishable manner; an input designation part for accepting the designation of an object whose adoption/non-adoption result is desired to be reversed among the objects displayed by the display output part; and a parameter changing part for changing one of the allowable ranges stored in the storage part so that the adoption/non-adoption result of the object designated by the input designation part is reversed.

According to the first aspect of the present invention, a user views the adoption/non-adoption result of the objects to change the allowable range of a parameter so that the adoption/non-adoption result becomes proper. This makes the allowable range of the parameter proper with ease.

Preferably, the parameter changing part changes the one allowable range, based on an entry made by a user so as to make the change. The allowable range of the parameter is changed properly, based on the judgment of the user.

Preferably, the display output part displays the values of the parameters for the object designated by the input designation part. The allowable range of the parameter is changed more properly by reference to the displayed parameters.

Preferably, the display output part further displays which parameter is outside a corresponding one of the allowable ranges, when the object designated by the input designation part is an object not adopted. This allows the user to easily know the parameter with the allowable range to be changed.

Preferably, the image processing apparatus further comprises a histogram display part for displaying a distribution of measurement values of each of the parameters for the plurality of objects in the form of a histogram. This allows the user to view the distribution of the measurement values, thereby changing the allowable range of the parameter more properly, based on the distribution.

Preferably, the parameter changing part automatically judges a parameter with an allowable range to be changed to change the allowable range of the parameter by reference to the values of the parameters of the object designated by the input designation part. Thus, it is only necessary for the user to designate an object the adoption/non-adoption result of which is desired to be reversed, whereby the allowable range of the parameter is automatically changed so that the adoption/non-adoption result of the object is reversed.

According to a second aspect of the present invention, a method of processing an image comprises the steps of: a) extracting a plurality of objects from an image; b) determining that an object having parameters within allowable ranges is adopted and that an object having at least one of the parameters outside a corresponding one of the allowable ranges is not adopted among the plurality of objects; c) displaying the object adopted and the object not adopted in the step b) in a distinguishable manner; d) accepting the designation of an object whose adoption/non-adoption result is desired to be reversed among the objects displayed in the step c); and e) changing one of the allowable ranges so that the adoption/non-adoption result of the object designated in the step d) is reversed.

A third aspect of the present invention is intended for a storage medium readable by a computer and having an image processing program stored therein. The image processing program causes the computer to perform the steps of: a) extracting a plurality of objects from an image; b) determining that an object having parameters within allowable ranges is adopted and that an object having at least one of the parameters outside a corresponding one of the allowable ranges is not adopted among the plurality of objects; c) displaying the object adopted and the object not adopted in the step b) in a distinguishable manner; d) accepting the designation of an object whose adoption/non-adoption result is desired to be reversed among the objects displayed in the step c); and e) changing one of the allowable ranges so that the adoption/non-adoption result of the object designated in the step d) is reversed.

According to the second and third aspects of the present invention, a user views the adoption/non-adoption result of the objects to change the allowable range of a parameter so that the adoption/non-adoption result becomes proper. This makes the allowable range of the parameter proper with ease.

Preferably, the one allowable range is changed in the step e), based on an entry made by a user so as to make the change. The allowable range of the parameter is changed properly, based on the judgment of the user.

Preferably, the second and third aspects further comprise the step of f) displaying the values of the parameters for the object designated in the step d), the step f) being performed before the step e). The allowable range of the parameter is changed more properly by reference to the displayed parameters.

Preferably, which parameter is outside a corresponding one of the allowable ranges is further displayed in the step f), when the object designated in the step d) is an object not adopted. This allows the user to easily know the parameter with the allowable range to be changed.

Preferably, the second and third aspects further comprise the step of displaying a distribution of measurement values of each of the parameters for the plurality of objects in the form of a histogram. This allows the user to view the distribution of the measurement values, thereby changing the allowable range of the parameter more properly, based on the distribution.

Preferably, the computer automatically judges a parameter with an allowable range to be changed to change the allowable range of the parameter in the step e) by reference to the values of the parameters of the object designated in the step d). Thus, it is only necessary for the user to designate an object the adoption/non-adoption result of which is desired to be reversed, whereby the allowable range of the parameter is automatically changed so that the adoption/non-adoption result of the object is reversed.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

<1. Configuration of Image Acquisition Apparatus>

Figure 1:
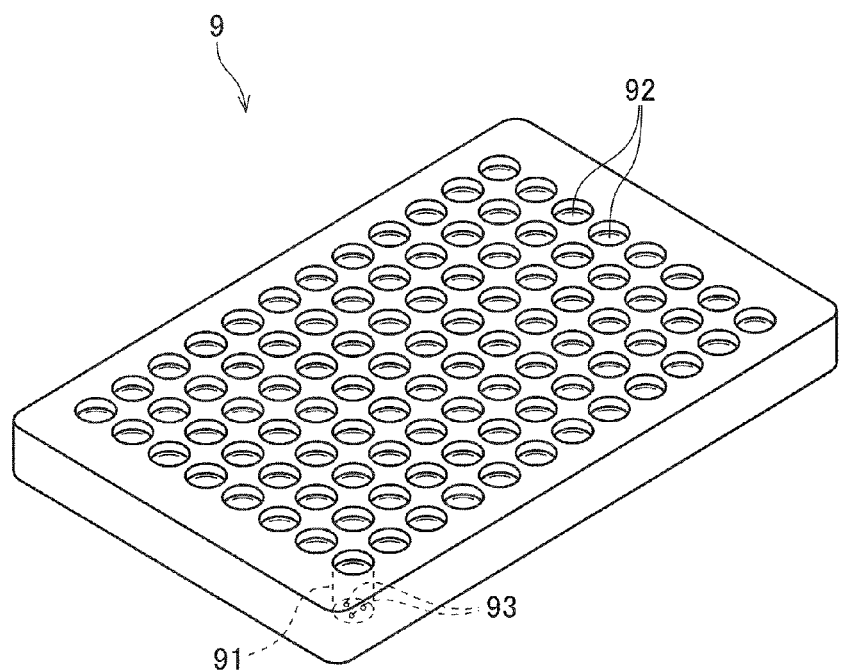
FIG. 1 is a perspective view showing an example of a well plate.

FIG. 1 is a perspective view showing an example of a well plate 9 to be set in an image acquisition apparatus 1. The well plate 9 is a generally plate-shaped specimen container having a plurality of depressions or wells 91. An example of the material of the well plate 9 includes a transparent resin which allows light to pass therethrough. As shown in FIG. 1, the wells 91 are arranged regularly in the upper surface of the well plate 9. Biological cells 93 to be observed are held with a culture solution 92 in each of the wells 91. Compounds with different concentrations and different compositions are added to the culture solution 92 in the wells 91, respectively.

Figure 2:
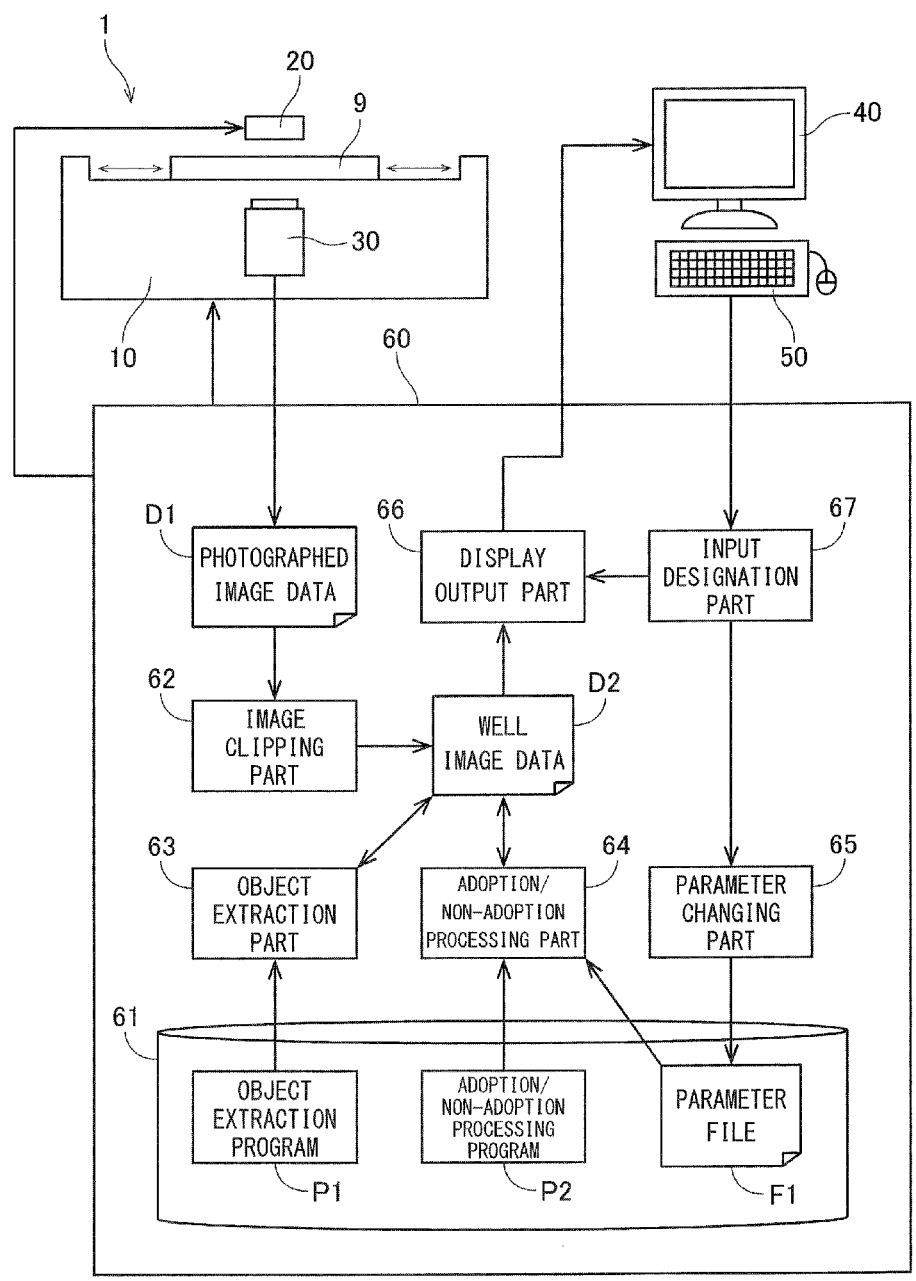
FIG. 2 is a view conceptually showing a configuration of an image acquisition apparatus.

FIG. 2 is a view conceptually showing a configuration of the image acquisition apparatus 1 according to the preferred embodiment of the present invention. This image acquisition apparatus 1 is an apparatus for photographing the well plate 9 to judge whether to adopt each of the cells 93 in the wells 91 or not from the resultant image data. The image acquisition apparatus 1 is used, for example, for a screening step for narrowing down compounds serving as candidates for medical and pharmaceutical products in the field of research and development of the medical and pharmaceutical products. An operator for the screening step uses the image acquisition apparatus 1 to acquire image data about the well plate 9, thereby obtaining the result of judgment as to whether to adopt each of the cells 93 in the wells 91 or not. Then, the operator compares and analyzes the obtained results to verify the effects of the compounds added to the culture solution 92.

As shown in FIG. 2, the image acquisition apparatus 1 according to the present preferred embodiment includes a plate holder 10, a light emitting part 20, an imaging part 30, a display device 40, an input device 50 and a computer 60. The plate holder 10, the light emitting part 20, the imaging part 30, the display device 40 and the input device 50 are electrically connected to the computer 60.

The plate holder 10 is a table for holding the well plate 9 thereon. The well plate 9 in a horizontal attitude with the bottom thereof positioned to face downward is set on the plate holder 10. The plate holder 10 includes a drive mechanism not shown for moving the well plate 9 laterally. The drive mechanism includes, for example, a motor, and a power transmission mechanism such as a ball screw for transmitting the driving force of the motor. When the drive mechanism is brought into operation, the well plate 9 moves relative to the imaging part 30, so that the wells 91 come into the field of view of the imaging part 30 in sequential order.

The light emitting part 20 and the imaging part 30 are disposed respectively over and under the well plate 9 held on the plate holder 10. The imaging part 30 is implemented, for example, by a line sensor including an optical system such as a lens, and an imaging device such as CCD, CMOS or other imaging devices. The well plate 9 is photographed in a manner to be described below. While white light is directed from the light emitting part 20 toward part of the well plate 9, the imaging part 30 photographs that part of the well plate 9. Then, the well plate 9 is moved laterally, and is photographed in a similar manner repeatedly. As a result, photographed image data D1 about the entire well plate 9 is acquired.

The light emitting part 20 may be any device which directs light toward the well plate 9. The light emitting part 20 may have a light source disposed in a position deviated from over the well plate 9, and be configured to direct light therefrom through an optical system such as a mirror onto the well plate 9. Also, the light emitting part 20 may be disposed under the well plate 9, whereas the imaging part 30 be disposed over the well plate 9. Further, the light emitting part 20 may be configured to cause light reflected from the well plate 9 to enter the imaging part 30.

The display device 40 is a section for displaying various pieces of information related to image processing in the image acquisition apparatus 1. The display device 40 displays a main window 41, a pop-up windows 42 and 44, a histogram display window 43 and the like which will be described later. A liquid crystal display, for example, is used as the display device 40. The input device 50 is a section for inputting various commands to the computer 60. A keyboard and a mouse, for example, are used as the input device 50. A user of the image acquisition apparatus 1 may manipulate the input device 50 to input various commands to the computer 60 while viewing the display device 40.

Both the functions of the display device 40 and the functions of the input device 50 may be implemented by a single device such as a touch panel display device.

The computer 60 functions both as a controller for controlling the operations of the aforementioned parts of the image acquisition apparatus 1 and as an image processing apparatus for judging whether to adopt each of the cells 93 in the wells 91 or not, based on the acquired image data. The computer 60 includes a CPU and a memory. The CPU operates in accordance with previously set computer programs, input signals and various data, whereby the computer 60 controls the operations of the aforementioned drive mechanism, the light emitting part 20 and the imaging part 30. Thus, the photographing of the well plate 9 is performed in the image acquisition apparatus 1.

As conceptually shown in FIG. 2, the computer 60 according to the present preferred embodiment includes an image clipping part 62, an object extraction part 63, an adoption/non-adoption processing part 64, a parameter changing part 65, a display output part 66 and an input designation part 67. The CPU in the computer 60 performs computation processes while referencing computer programs stored in a storage part 61, whereby the functions of the image clipping part 62, the object extraction part 63, the adoption/non-adoption processing part 64, the parameter changing part 65, the display output part 66 and the input designation part 67 are implemented.

The storage part 61 is a section for storing therein various data to be handled in the image acquisition apparatus 1. The storage part 61 is implemented by a storage device including a hard disk drive, a RAM and the like, for example. The storage part 61 may be part of hardware constituting the computer 60, as shown in FIG. 2, or be an external storage device connected to the computer 60.

As shown in FIG. 2, an object extraction program P1, an adoption/non-adoption processing program P2 and a parameter file F1 for use in image processing to be described later are stored in the storage part 61 according to the present preferred embodiment. Computer programs including the object extraction program P1 and the adoption/non-adoption processing program P2 are read from a computer-readable storage medium including a CD, a DVD and the like, for example, and are stored in the storage part 61. The parameter file F1 includes the allowable ranges of the parameters for reference during the execution of the adoption/non-adoption processing program P2 which are held therein as rewritable data.

<2. Image Processing>
<2-1. Clipping of Image to Display of Window>

Figure 3:
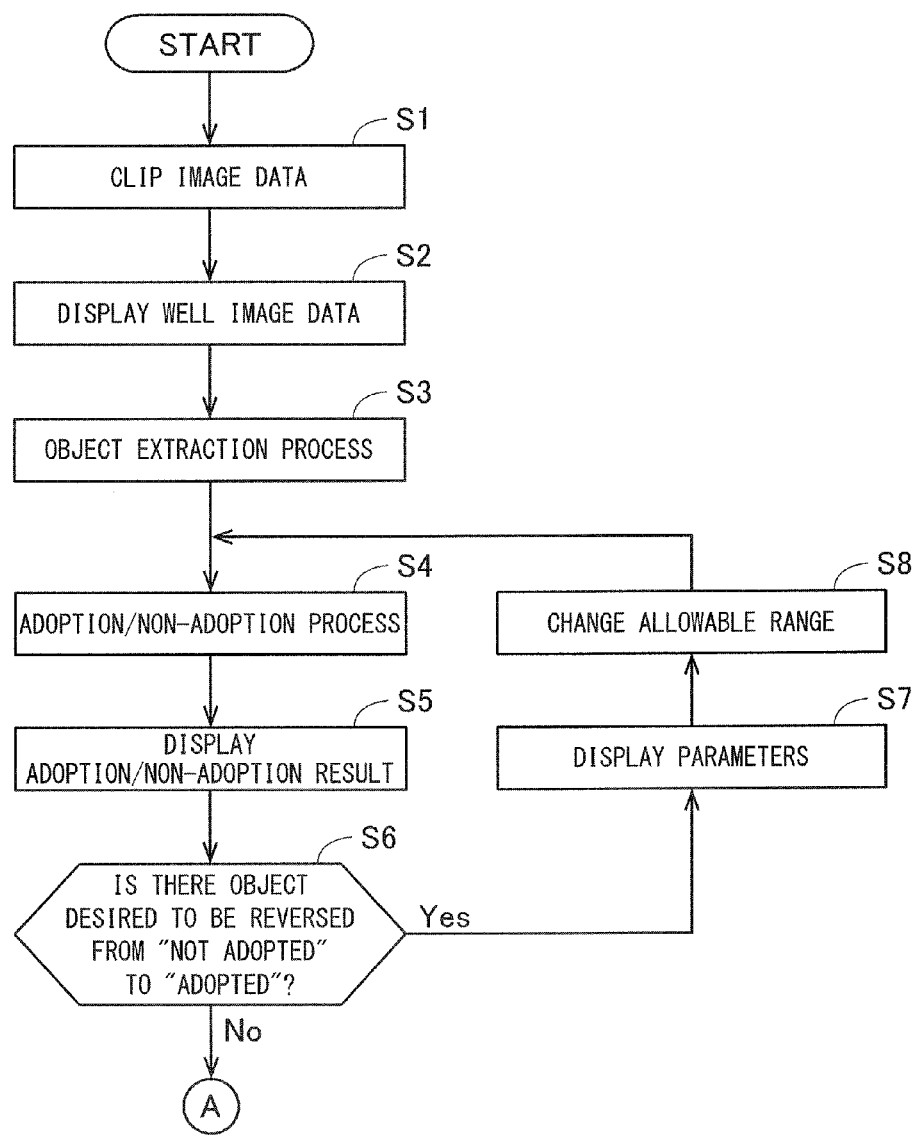
FIGS. 3 to 5 are flow diagrams showing a procedure of image processing.
Figure 4:
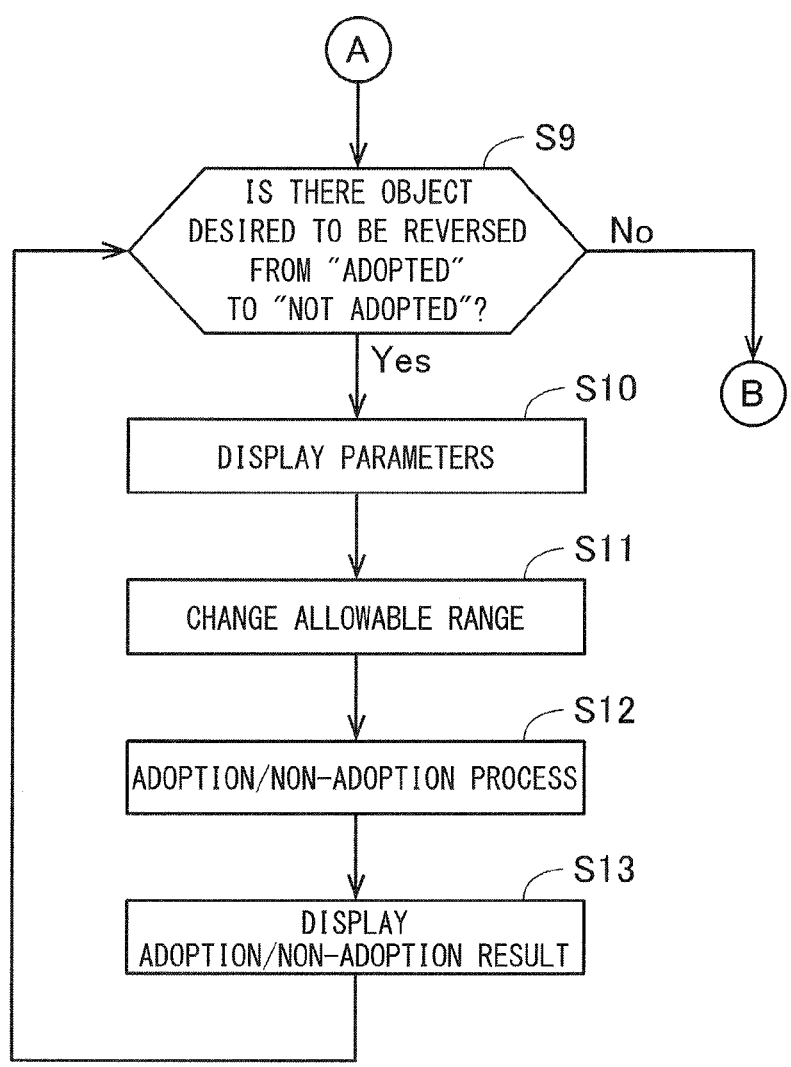
Figure 5:
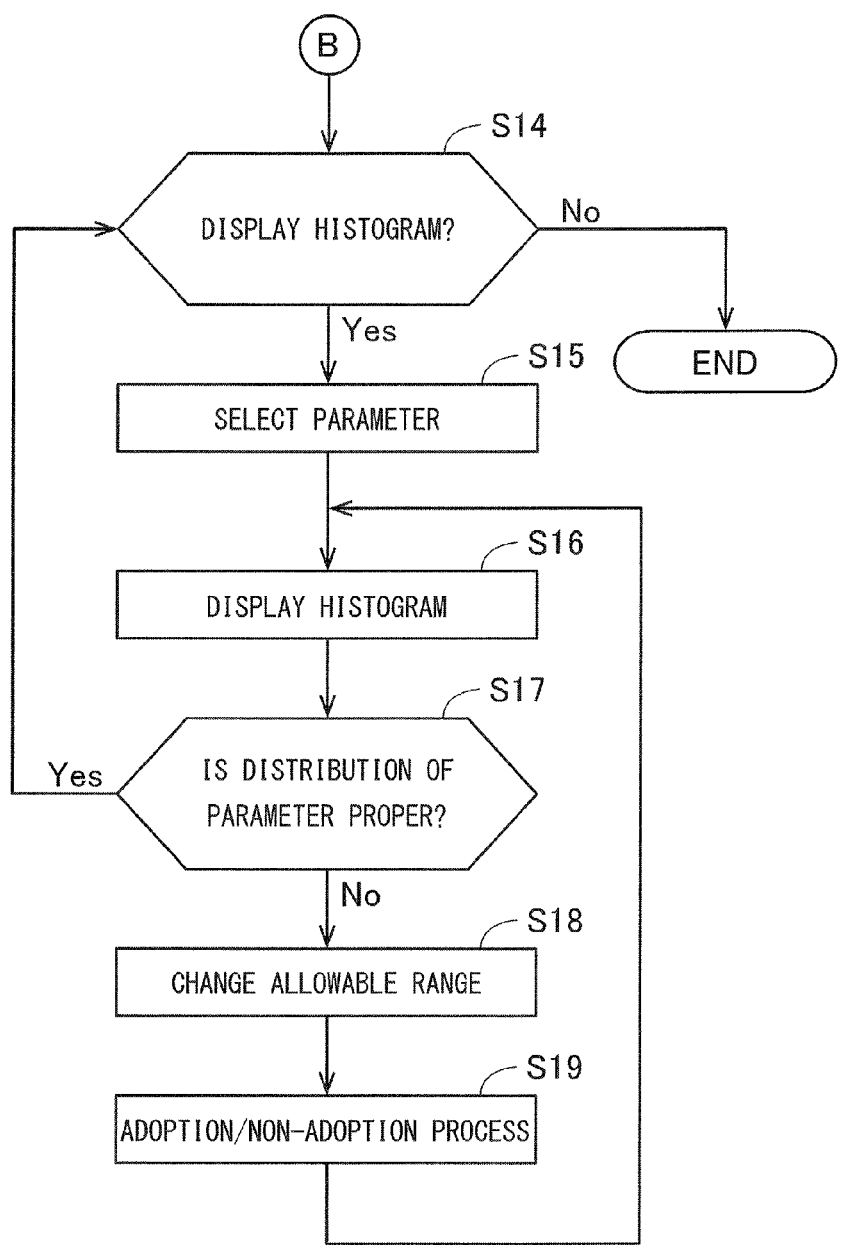

FIGS. 3 to 5 are flow diagrams showing a procedure of the image processing executed in the image acquisition apparatus 1 after the acquisition of the photographed image data D1. The computer 60 operates the image clipping part 62, the object extraction part 63, the adoption/non-adoption processing part 64, the parameter changing part 65, the display output part 66 and the input designation part 67 while referencing an input signal from the input device 50, the object extraction program P1, the adoption/non-adoption processing program P2, the parameter file F1 and the like, whereby the image processing shown in FIGS. 3 to 5 is executed. The procedure of the image processing will be described with reference to FIG. 2 and the flow diagrams of FIGS. 3 to 5.

Upon being acquired in the imaging part 30, the photographed image data D1 is inputted to the image clipping part 62 in the computer 60. The image clipping part 62 clips image data about each of the wells 91 from the photographed image data D1 (in Step S1). The image data about each of the wells 91 is referred to as "well image data D2" hereinafter. Each well image data D2 includes an image of a cell clump that is a group of three-dimensionally aggregated cells 93.

Figure 6:
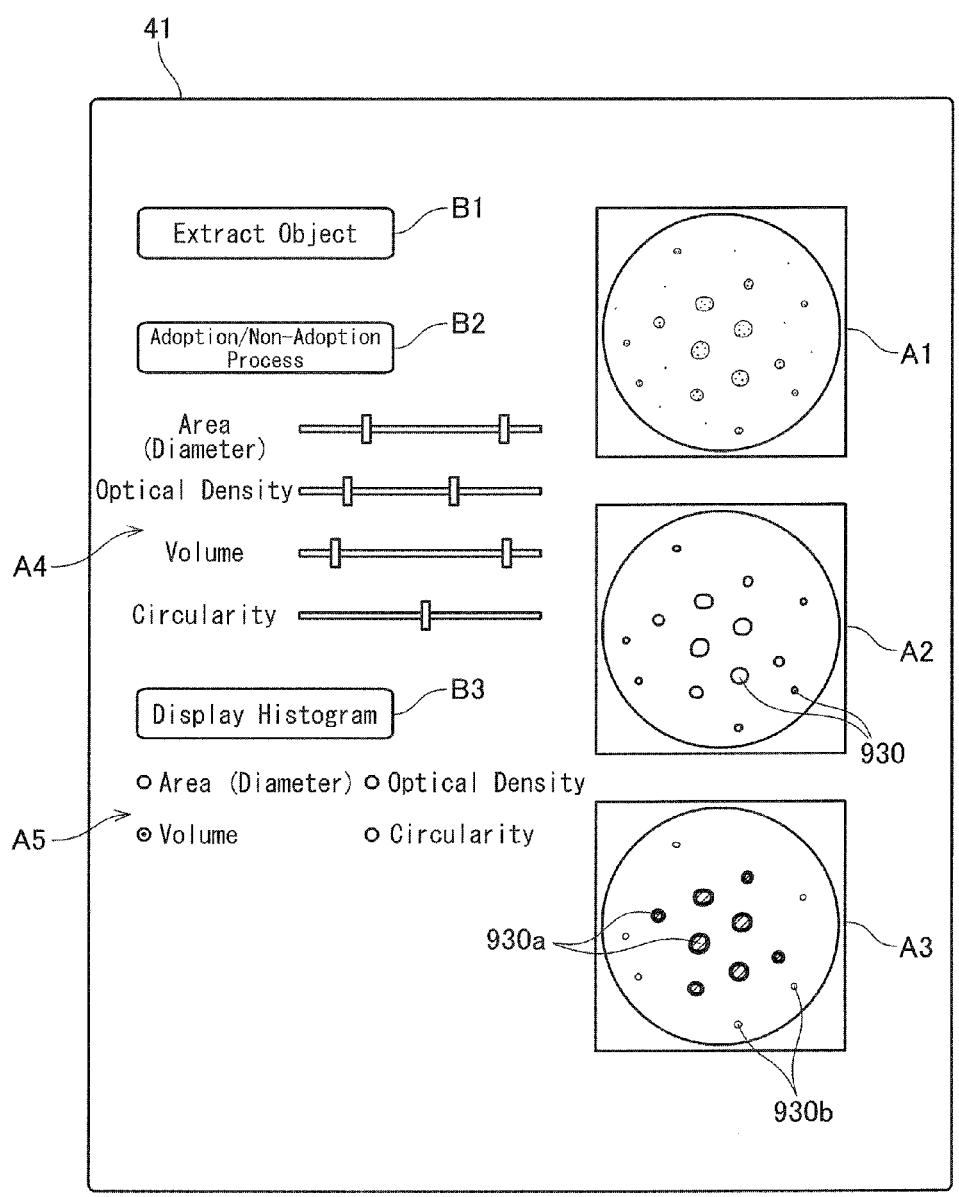
FIGS. 6 and 7 are views showing an example of a main window.
Figure 7:
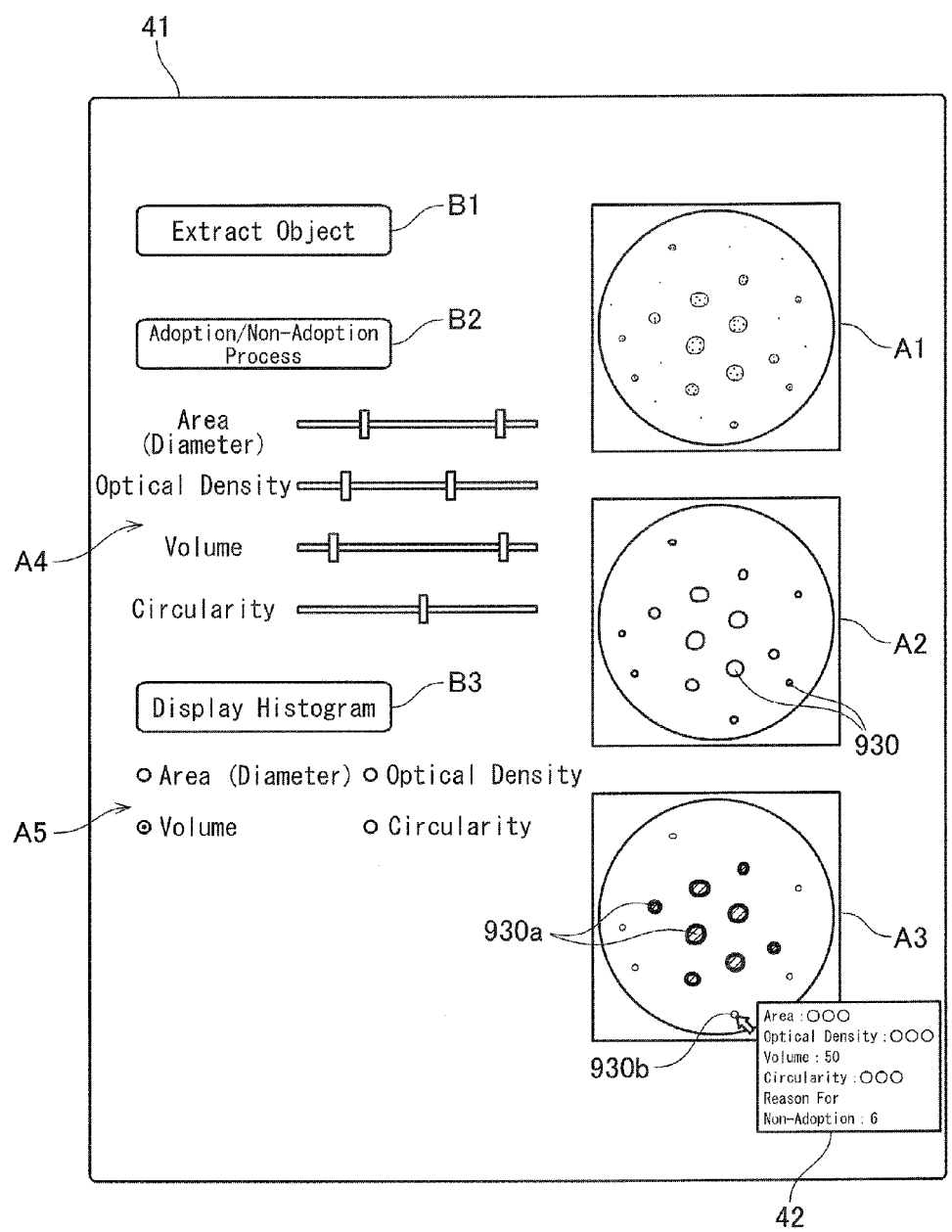

Next, the display output part 66 causes the display device 40 to display the main window 41 serving as a user interface. FIGS. 6 and 7 are views showing an example of the main window 41. In the example of FIGS. 6 and 7, three image display regions A1 to A3 are disposed within the main window 41. One of the plurality of well image data D2 clipped in Step S1 is displayed in the uppermost image display region A1 (in Step S2).

In the example of FIGS. 6 and 7, an object extraction button B1, an adoption/non-adoption processing button B2 and a histogram display button B3 are further disposed within the main window 41. The object extraction button B1 and the adoption/non-adoption processing button B2 are buttons for operating the object extraction part 63 and the adoption/non-adoption processing part 64, respectively. The histogram display button B3 is a button for operating the aforementioned display output part 66 to cause the display device 40 to display a histogram to be described later.

The user of the image acquisition apparatus 1 may manipulate the input device 50 to individually and independently select these three buttons B1 to B3. In other words, the user may individually and independently cause the operation of the object extraction part 63, the operation of the adoption/non-adoption processing part 64 and the display of a histogram.

In the example of FIGS. 6 and 7, a parameter setting part A4 for setting the allowable ranges of the respective parameters is disposed under the adoption/non-adoption processing button B2. In the parameter setting part A4, the upper limits and the lower limits of the parameters are indicated by the positions of pointers on linear gauges. In the example of FIGS. 6 and 7 are indicated the upper limits and the lower limits of the following parameters: "area (diameter)", "optical density", "volume" and "circularity". The upper limits and the lower limits of the parameters displayed in the parameter setting part A4 are based on the allowable ranges of the parameters read from the parameter file F1. The user of the image acquisition apparatus 1 may manipulate the input device 50 to slide the pointers leftwardly and rightwardly, thereby changing the upper limits and the lower limits of the parameters.

The parameter setting part A4 need not be displayed in the form of the linear gauges as shown in FIG. 6. For example, the upper limits and the lower limits of the parameters may be displayed in a text box. In this case, the user makes entries in the text box to change the upper limits and the lower limits of the parameters.

<2-2. Extraction of Objects>

After the main window 41 appears, the user of the image acquisition apparatus 1 initially manipulates the input device 50 to select the object extraction button B1 within the main window 41. In response to this, the object extraction part 63 performs the process of extracting a plurality of objects 930 corresponding to respective cells from the well image data D2 (in Step S3).

The process of extracting the objects 930 is performed, for example, by extracting pixels having pixel level values falling within a previously set range from the well image data D2. The upper limit of the pixel level values for use in the extraction of the objects 930 may be, for example, a value obtained by multiplying the inputted upper limit of the pixel level values by a predetermined coefficient (e.g., 0.8). The lower limit of the pixel level values for use in the extraction of the objects 930 may be, for example, a value obtained by multiplying the inputted lower limit of the pixel level values by a predetermined coefficient (e.g., 1.2). The upper limit and the lower limit for use in the extraction of the objects 930 may be changed by making entries, depending on whether the result of extraction is appropriate or not.

The well image data D2 after the object extraction is displayed in the middle image display region A2 within the main window 41. For example, only the extracted objects are displayed in solid lines, as shown in FIGS. 6 and 7.

The object extraction part 63 measures a plurality of types of parameters for each of the extracted objects 930. The parameters, i.e. area (diameter), optical density, volume and circularity, are measured by image processing in the present preferred embodiment. For volume, the optical density of each of the pixels constituting an object is used as a substitute for the height thereof, and the total value of the optical densities of the pixels shall be the approximate volume or we may call the pseudo volume of a cell estimated from the object.

<2-3. Adoption/Non-Adoption Process>

Next, the user of the image acquisition apparatus 1 manipulates the input device 50 to select the adoption/non-adoption processing button B2 within the main window 41. In response to this, the adoption/non-adoption processing part 64 performs an adoption/non-adoption process for classifying the plurality of objects 930 included in the well image data D2 as adopted or as not adopted (in Step S4). In the present preferred embodiment, an object 930a estimated to be a living cell is "adopted" and an object 930b estimated to be a dead cell is "not adopted".

The process in Step S4 will be described in detail. First, the adoption/non-adoption processing part 64 reads the allowable ranges of the respective parameters from the parameter file F1 stored in the storage part 61. Then, the measurement values of the parameters for a target object 930 are checked in sequential order. When the target object 930 has at least one parameter which is not within a corresponding one of the allowable ranges, this target object 930b is "not adopted". When all of the parameters for the target object 930 are within the respective allowable ranges, this target object 930a is "adopted".

After the completion of the adoption/non-adoption process, the display output part 66 displays the adoption/non-adoption result of each of the objects 930 in the lower image display region A3 within the main window 41 (in Step S5). The objects 930a which are "adopted" and the objects 930b which are "not adopted" by the adoption/non-adoption processing part 64 are displayed in a visually distinguishable manner in the image display region A3. In the example of FIG. 6, the objects 930a which are "adopted" are highlighted in thick solid lines and shaded areas, and the objects 930b which are "not adopted" are shown in thin solid lines.

The adoption/non-adoption result in the image display region A3 may be displayed in a different manner from that shown in FIG. 6. For example, the objects 930a which are "adopted" may be highlighted using colored outlines.

<2-4. Reversal of Adoption/Non-Adoption Result from "Not Adopted" to "Adopted">

Subsequently, the user of the image acquisition apparatus 1 checks whether the adoption/non-adoption result of each of the objects 930 displayed in the image display region A3 is proper or not. In this process, a judgment is first made as to whether there is an object to be adopted, i.e. an object the adoption/non-adoption result of which is desired to be reversed from "not adopted" to "adopted", among the plurality of objects 930b which are "not adopted" in the image display region A3 (in Step S6).

When there is an object 930b the adoption/non-adoption result of which is desired to be reversed from "not adopted" to "adopted" (Yes in Step S6), the user of the image acquisition apparatus 1 manipulates the input device 50 to designate the object 930b in the image display region A3. Specifically, upon receiving an input signal from the input device 50, the input designation part 67 designates the object

930b. The display output part 66 then causes the pop-up window 42 indicating information about the object 930b to appear near the object 930b within the main window 41, as shown in FIG. 7.

The pop-up window 42 shows the values of the parameters measured for the designated object 930b and the reason why the object 930b is "not adopted" (the reason for non-adoption) (in Step S7).

Figure 8:
FIG. 8 shows an example of table data specifying a correspondence between reasons for non-adoption and numbers.

FIG. 8 shows an example of table data T1 specifying a correspondence between numbers appearing in the section of the reason for non-adoption in the pop-up window 42 and the details of the reason for non-adoption. The computer 60 has such table data T1 stored in the storage part 61. The display output part 66 displays the number of the reason for non-adoption in the pop-up window 42 by referencing the result of processing of the adoption/non-adoption processing part 64 and the table data T1.

For example, when the volume of the object 930b is less than the lower limit thereof, the number of the reason for non-adoption is "6" based on the table data T1. Thus, the display output part 66 displays "6" in the section of the reason for non-adoption in the pop-up window 42, as shown in FIG. 7. The user of the image acquisition apparatus 1 views the pop-up window 42 to know which parameter of the object 930b has been outside the allowable range and also to know the measurement value of the parameter falling outside the allowable range in the pop-up window 42.

After viewing the pop-up window 42, the user manipulates the input device 50 to change the allowable range of the parameter related to the reason for non-adoption (in Step S8). In this process, the user slides a pointer in the parameter setting part A4 within the main window 41 to change and input the upper limit or the lower limit of the parameter related to the reason for non-adoption. For example, when the measurement value of the "volume" which is the reason for non-adoption is "50" for the object 930b in the pop-up window 42 as shown in FIG. 7, the upper limit or the lower limit of the allowable range may be changed so that 50 is included in the allowable range of the volume in the parameter setting part A4. After the manipulation of changing the parameter is performed, the parameter changing part 65 in the computer 60 rewrites the allowable range held in the parameter file F1.

Thereafter, the procedure returns to Step S4, and the adoption/non-adoption process in Step S4 and the display of the adoption/non-adoption result in Step S5 are executed again. In Step S4, the adoption/non-adoption processing part 64 performs the adoption/non-adoption process of the plurality of objects 930, based on the changed allowable range. By rewriting the parameter file F1, the adoption/non-adoption result of the object 930b designated in Step S7 described above is reversed from "not adopted" to "adopted". Then, the adoption/non-adoption result after the change is displayed in the image display region A3 within the main window 41 in Step S5. This allows the user of the image acquisition apparatus 1 to immediately view the adoption/non-adoption result obtained after the rewriting of the parameter file F1.

<2.5. Reversal of Adoption/Non-Adoption Result from "Adopted" to "Not Adopted">

When there is no object the adoption/non-adoption result of which is desired to be reversed from "not adopted" to "adopted" in Step S6 (No in Step S6), the user of the image acquisition apparatus 1 subsequently judges whether there is an object to be "not adopted", i.e. an object the adoption/non-adoption result of which is desired to be reversed from "adopted" to "not adopted", among the plurality of objects 930a which are "adopted" in the image display region A3 (in Step S9).

Figure 9:
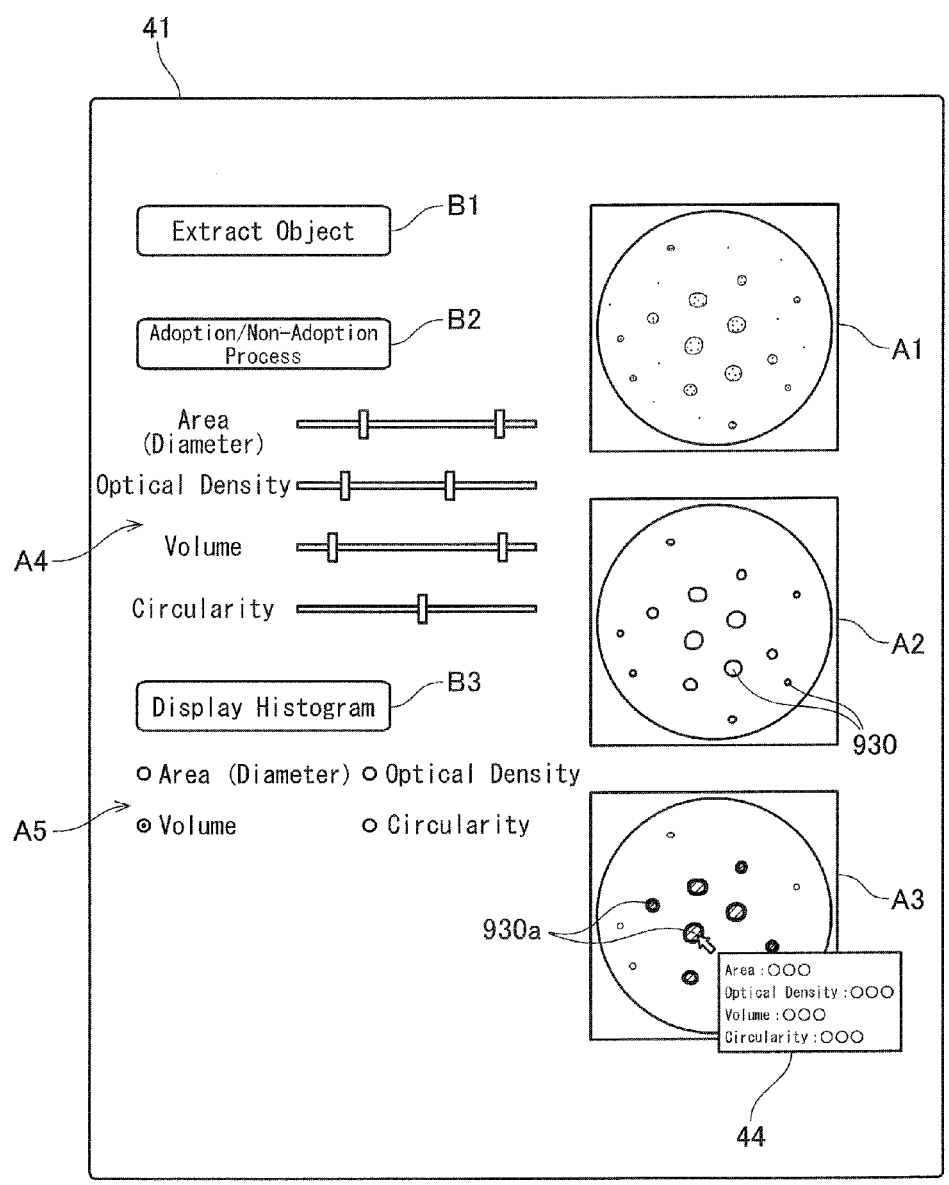
FIG. 9 is a view showing an example of a main window.

When there is an object 930a the adoption/non-adoption result of which is desired to be reversed from "adopted" to "not adopted" (Yes in Step S9), the user of the image acquisition apparatus 1 manipulates the input device 50 to designate the object 930a in the image display region A3. Specifically, upon receiving an input signal from the input device 50, the input designation part 67 designates the object 930a. The display output part 66 then causes the pop-up window 44 indicating information about the object 930a to appear near the object 930a within the main window 41 as shown in FIG. 9. The pop-up window 44 shows the values of the parameters measured for the designated object 930a (in Step S10).

After viewing the pop-up window 44, the user manipulates the input device 50 to change the allowable range of any parameter (in Step S11). In this process, the user slides a pointer in the parameter setting part A4 within the main window 41 to change the upper limit or the lower limit of the parameter. For example, the user may direct attention toward the parameter closest to the upper limit or the lower limit of the allowable range among the measurement values of the parameters displayed on the pop-up window 44 to change the upper limit or the lower limit of the allowable range so that the measurement value of the parameter falls outside the allowable range. Alternatively, the user may direct attention toward a parameter which is judged to correspond to a reason for non-adoption as a result of viewing of the designated object 930a to change the upper limit or the lower limit of the allowable range so that the measurement value of the parameter falls outside the allowable range. After the manipulation of changing the parameter is performed, the parameter changing part 65 in the computer 60 rewrites the allowable range held in the parameter file F1.

Thereafter, the adoption/non-adoption process of the objects (in Step S12) and the display of the adoption/non-adoption result (in Step S13) are executed again. The adoption/non-adoption process in Step S12 is performed in a manner similar to that in Step S4. Specifically, the adoption/non-adoption processing part 64 performs the adoption/non-adoption process on the plurality of objects 930, based on the changed allowable range. By rewriting the parameter file F1, the adoption/non-adoption result of the object 930a designated in Step S10 described above is reversed from "adopted" to "not adopted". The display of the adoption/non-adoption result in Step S13 is performed in a manner similar to that in Step S5. Specifically, the adoption/non-adoption result after the change is displayed in the image display region A3 within the main window 41. This allows the user of the image acquisition apparatus 1 to immediately view the adoption/non-adoption result obtained after the rewriting of the parameter file F1.

<2-6. Display of Histogram>

Thereafter, the procedure returns to Step S9, and the judgment in Step S9 is made again. When there is no object 930 the adoption/non-adoption result of which is desired to be reversed from "adopted" to "not adopted" (No in Step S9), the user of the image acquisition apparatus 1 subsequently judges whether to display a histogram for each parameter or not (in Step S14).

For display of the histogram (Yes in Step S14), the user of the image acquisition apparatus 1 manipulates the input device 50 to select a check box A5 for a parameter for which a histogram is desired to be displayed among a plurality of check boxes A5 disposed under the histogram display button B3 within the main window 41 (in Step S15). Then, the user selects the histogram display button B3. In response to this, the display output part 66 causes the display device 40 to display the histogram display window 43 (in Step S16). In other words, the display output part 66 functions as a histogram display part in the present preferred embodiment.

Figure 10:
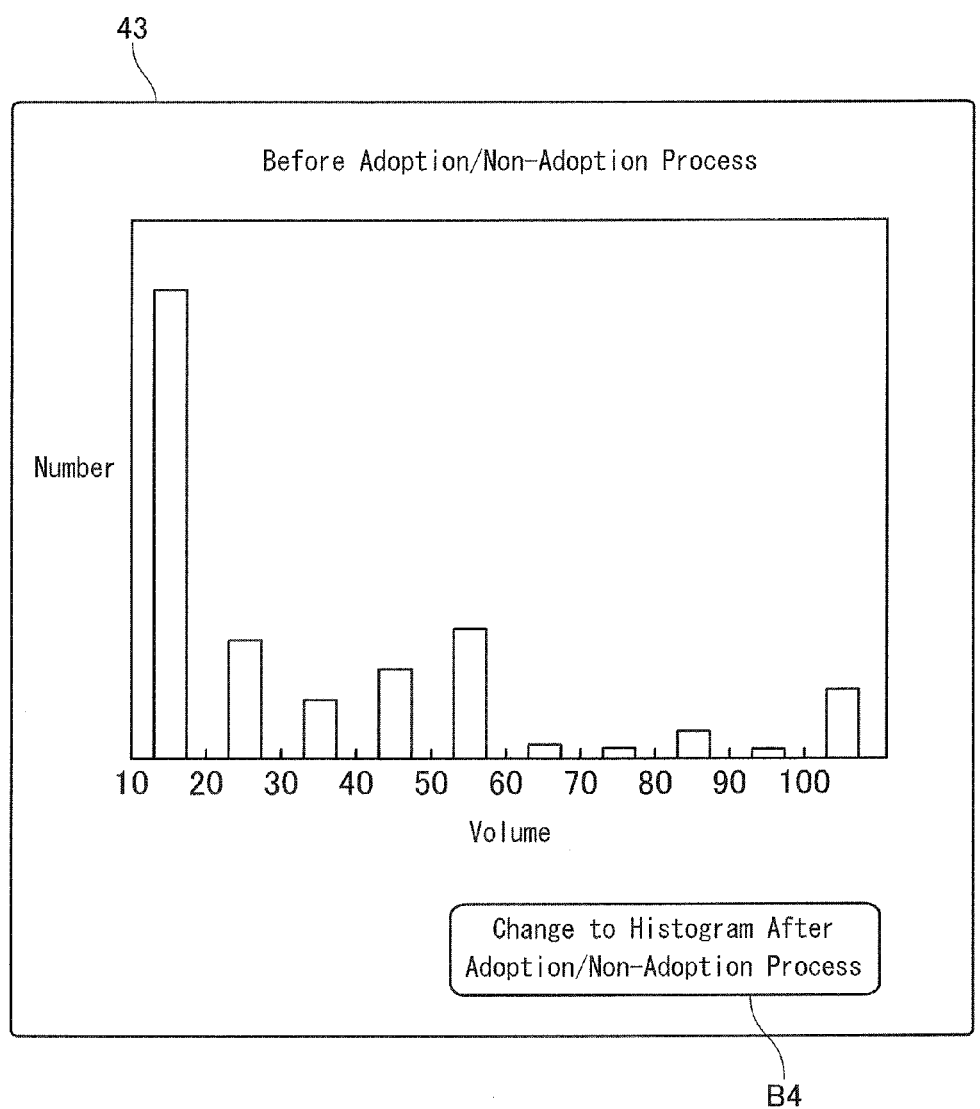
FIGS. 10 and 11 show examples of a histogram display window.
Figure 11:
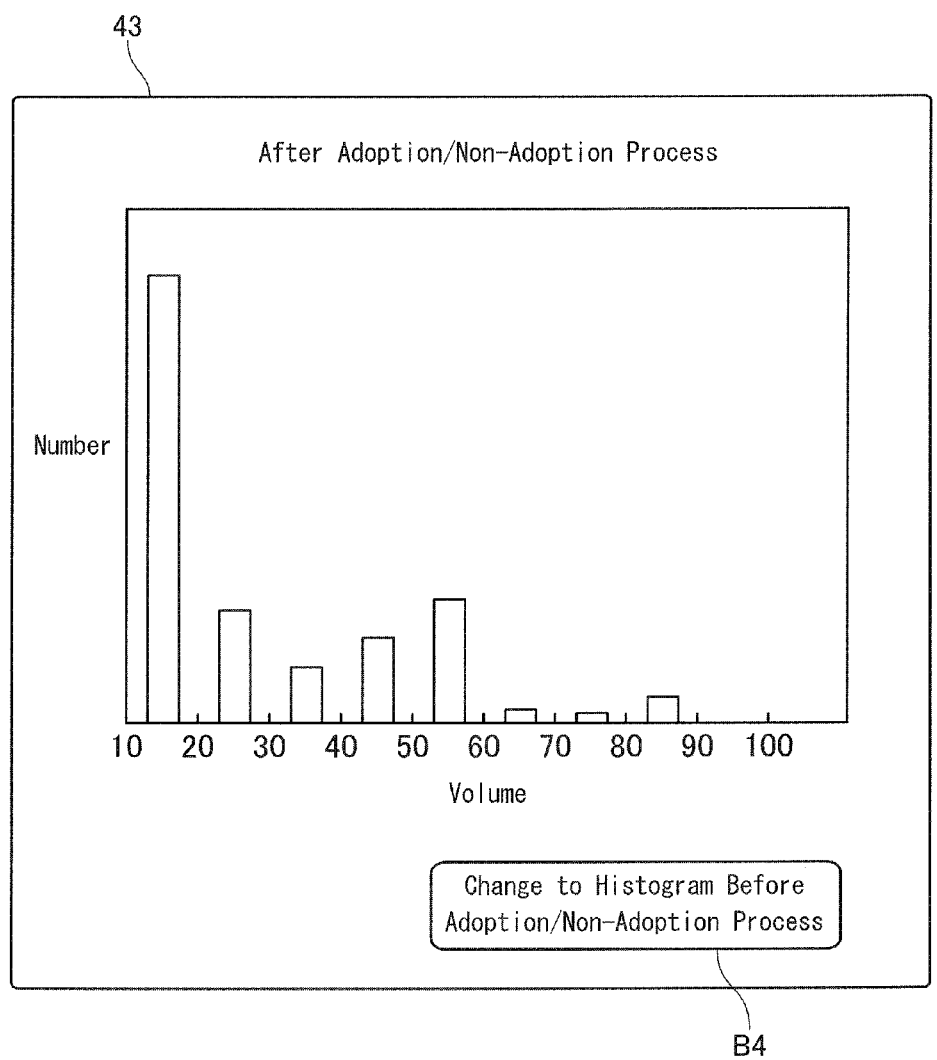

FIGS. 10 and 11 show examples of the histogram display window 43. In the examples of FIGS. 9 and 10, a distribution of the measurement values of the volume for the plurality of objects 930 included in the well image data D2 is displayed in the form of a histogram. FIG. 10 shows a distribution for all of the objects 930 before the adoption/non-adoption process, and FIG. 11 shows a distribution for only the objects 930a which are "adopted". A change between the display of FIG. 10 and the display of FIG. 11 is made by selecting a change button B4 disposed at the bottom right of the histogram display window 43.

The user of the image acquisition apparatus 1 views the histogram display window 43 to judge whether the distribution of the parameter is proper or not (in Step S17). When the distribution is not proper (No in Step S17), the user manipulates the input device 50 to change the allowable range of the parameter (in Step S18).

In this process, the user slides a pointer in the parameter setting part A4 within the main window 41 to change the upper limit or the lower limit of the parameter of interest. For example, when it is judged that the inclusion of objects 930a having a volume of not less than 60 in the histogram display window 43 of FIG. 11 is improper, the upper limit of the volume may be changed to 60 in the parameter setting part A4. After the manipulation of changing the parameter is performed, the parameter changing part 65 in the computer 60 rewrites the allowable range held in the parameter file F1.

Displaying the distribution of the measurement values of each parameter in the form of a histogram in this manner allows the user to visually recognize the distribution of the measurement values. This allows the user to change the allowable range of each parameter more properly based on the distribution.

Thereafter, the adoption/non-adoption process of the objects (in Step S19) is executed again. The adoption/non-adoption process in Step S19 is performed in a manner similar to that in Step S4. Specifically, the adoption/non-adoption processing part 64 performs the adoption/non-adoption process on the plurality of objects 930, based on the changed allowable range. Then, the procedure returns to Step S16, in which the histogram is displayed again. By rewriting the parameter file F1, a distribution based on the new allowable range is displayed in the histogram display window 43. This allows the user of the image acquisition apparatus 1 to immediately view the histogram obtained after the rewriting of the parameter file F1.

When the distribution of the parameter is proper (Yes in Step S17), the procedure returns to Step S14, in which the user of the image acquisition apparatus 1 judges whether to display a histogram for another parameter or not. When there is no need to display the histogram (No in Step S14), the series of image processing steps are completed.

As described above, the objects 930a which are "adopted" and the objects 930b which are "not adopted" in the adoption/non-adoption process are displayed in a distinguishable manner on the display device 40 in the image acquisition apparatus 1 according to the present preferred embodiment. An object 930 the adoption/non-adoption result of which is desired to be reversed is designated among the plurality of displayed objects 930. The parameter file F1 stored in the storage part 61 is rewritten so that the adoption/non-adoption result of the designated object 930 is reversed. That is, the user views the adoption/non-adoption result of the objects 930 to change the allowable range of a parameter so that the adoption/non-adoption result becomes proper. This makes the allowable range of the parameter proper with ease. As a result, the adoption/non-adoption process is made proper.

In particular, the measurement values of the parameters for the object 930 the adoption/non-adoption result of which is desired to be reversed are displayed in the pop-up windows 42 and 44 in the image acquisition apparatus 1 according to the present preferred embodiment. This allows the user of the image acquisition apparatus 1 to change the allowable ranges of the parameters more easily and properly by referencing the measurement values of the parameters displayed in the pop-up windows 42 and 44.

The image acquisition apparatus 1 according to the present preferred embodiment does not require any costly reagent when making a judgment as to whether to adopt the cells 93 or not. Thus, the judgment as to whether to adopt the cells 93 or not is made at low costs and at high speeds. Additionally, the image acquisition apparatus 1 is capable of making the judgment as to whether to adopt the cells 93 or not without damages to living cells to achieve the observation of changes in the same cells 93 with time.

Further, the image acquisition apparatus 1 according to the present preferred embodiment is capable of individually and independently executing the object extraction program P1 and the adoption/non-adoption processing program P2. If a desired result is not obtained, the image acquisition apparatus 1 may hence separately verify whether a problem lies in the object extraction program P1 or in the adoption/non-adoption processing program P2.

<3. Modifications>

While the one preferred embodiment according to the present invention has been described hereinabove, the present invention is not limited to the aforementioned preferred embodiment.

In the aforementioned preferred embodiment, the allowable ranges of the parameters are changed, based on entries made by the user so as to make the change. This achieves flexible changes in the allowable ranges of the parameters, based on judgments of the user. However, the parameter changing part 65 may be configured to automatically change the allowable ranges of the parameters.

For example, when the user designates an object 930b the adoption/non-adoption result of which is desired to be reversed from "not adopted" to "adopted", the parameter changing part 65 automatically judges the value of a parameter which is outside the allowable range for the object 930b to change the allowable range so that the parameter falls within the allowable range. Also, when the user designates an object 930b the adoption/non-adoption result of which is desired to be reversed from "adopted" to "not adopted", the parameter changing part 65 automatically judges the value of the parameter closest to the upper limit or the lower limit for the object 930b to change the allowable range so that the parameter falls outside the allowable range.

In this manner, the parameter changing part 65 may be configured to automatically judge the parameter with the allowable range to be changed by reference to the values of parameters of the object 930 designated by the input designation part 67. Thus, it is only necessary for the user to designate an object 930 the adoption/non-adoption result of which is desired to be reversed, whereby the allowable range of the parameter is automatically changed so that the adoption/non-adoption result of the object 930 is reversed.

The number of wells 91 included in the well plate 9 may be different from that shown in the example of FIG. 1. The shape of the wells 91 may be circular as seen in top plan view as shown in FIG. 1, and may be other shapes such as a rectangular shape.

The windows appearing on the display device 40 may be displayed in a different manner, so long as equivalent information is displayed thereon. In the aforementioned preferred embodiment, the objects are classified into two categories: "adopted" and "not adopted". However, other categories into which the classification is performed may be prepared in addition to "adopted" and "not adopted". Further, the present invention may be applied to images of other than cells.

The components described in the aforementioned preferred embodiment and in the various modifications may be consistently combined together, as appropriate.

While the invention has been described in detail, the foregoing description is in all aspects illustrative and not restrictive. It is understood that numerous other modifications and variations can be devised without departing from the scope of the invention.

What is claimed is:

1. An image processing apparatus for classifying an object included in an image corresponding to a cell as adopted or as not adopted, comprising:
    a storage part implemented by a programmed computer which stores therein allowable ranges of parameters for use in an adoption/non-adoption process for classifying an object corresponding to a cell included in an image as adopted or as not adopted;
    an object extraction part implemented by a programmed computer which extracts a plurality of objects from said image;
    an adoption/non-adoption processing part implemented by a programmed computer which determines that an object having said parameters within said allowable ranges is adopted and that an object having at least one of said parameters outside a corresponding one of said allowable ranges is not adopted among said plurality of objects;
    a display output part implemented by a programmed computer which displays the object adopted and the object not adopted by said adoption/non-adoption processing part in a distinguishable manner;
    an input designation part implemented by a programmed computer which accepts the designation of an object whose adoption/non-adoption result is desired to be reversed among the objects displayed by said display output part; and
    a parameter changing part implemented by a programmed computer which changes one of said allowable ranges stored in said storage part so that the adoption/non-adoption result of the object designated by said input designation part is reversed; wherein
    said parameter changing part automatically selects a parameter from a plurality of different parameters with an allowable range to be changed, to change the allowable range of the parameter by reference to the values of said parameters of the object designated by said input designation part,
    when the input designation part designates an object the adoption/non-adoption result of which is desired to be reversed from "not adopted" to "adopted", the parameter changing part automatically selects the parameter that is outside the allowable range from a plurality of different parameters, and changes the allowable range of the selected parameter so that the selected parameter falls within the allowable range, and stores the changed allowable range in the storage part, and
    when the input designation part designates an object the adoption/non-adoption result of which is desired to be reversed from "adopted" to "not adopted", the parameter changing part automatically selects the parameter that is closest to the upper limit or the lower limit of its allowable range from a plurality of different parameters, and changes the upper or lower limit of the allowable range of the selected parameter so that the parameter value falls outside the allowable range, and stores the changed allowable range in the storage part.

2. The image processing apparatus according to claim 1, wherein
    said parameter changing part changes said one allowable range, based on an entry made by a user via the input designation part so as to make the change.

3. The image processing apparatus according to claim 2, wherein
    said display output part displays the values of said parameters for the object designated by said input designation part.

4. The image processing apparatus according to claim 3, wherein
    said display output part further displays which parameter is outside a corresponding one of said allowable ranges, when the object designated by said input designation part is an object not adopted.

5. The image processing apparatus according to claim 1, further comprising
    a histogram display part implemented by a programmed computer which displays a distribution of measurement values of each of said parameters for said plurality of objects in the form of a histogram.

6. The image processing apparatus according to claim 1, wherein
    said image is an image of each well of a specimen container having a plurality of wells.

7. The image processing apparatus according to claim 1, wherein
    said image is an image of a cell clump that is a group of three-dimensionally aggregated cells.

8. A method of processing an image implemented by a programmed computer for classifying an object included in an image corresponding to a cell as adopted or as not adopted, comprising the steps of:
    a) extracting a plurality of objects corresponding to cells from an image;
    b) determining that an object having parameters within allowable ranges is adopted and that an object having at least one of said parameters outside a corresponding one of said allowable ranges is not adopted among said plurality of objects;
    c) displaying the object adopted and the object not adopted in said step b) in a distinguishable manner;
    d) accepting the designation of an object whose adoption/non-adoption result is desired to be reversed among the objects displayed in said step c); and
    e) changing one of said allowable ranges so that the adoption/non-adoption result of the object designated in said step d) is reversed;
    wherein the programmed computer automatically selects a parameter from a plurality of different parameters with an allowable range to be changed, to change the allowable range of the parameter in said step e) by reference to the values of said parameters of the object designated in step d), when an object the adoption/non-adoption result of which is desired to be reversed from "not adopted" to "adopted" is designated in said step d), the programmed computer automatically selects the parameter that is outside the allowable range from a plurality of different parameters, and changes the allowable range of the selected parameter so that the selected parameter falls within the allowable range in said step e), and stores the changed allowable range, and when an object the adoption/non-adoption result of which is desired to be reversed from "adopted" to "not adopted" is designated in said step d), the programmed computer automatically selects the parameter that is closest to the upper limit or the lower limit of its allowable range from a plurality of different parameters, and changes the upper or lower limit of the allowable range of the selected parameter so that the parameter value falls outside the allowable range in said step e), and stores the changed allowable range.

9. The method according to claim 8, wherein
said one allowable range is changed in said step e), based on an entry made by a user in step d) so as to make the change.

10. The method according to claim 9, further comprising the step of
f) displaying the values of said parameters for the object designated in said step d), said step f) being performed before said step e).

11. The method according to claim 10, wherein
which parameter is outside a corresponding one of said allowable ranges is further displayed in said step f), when the object designated in said step d) is an object not adopted.

12. The method according to claim 8, further comprising the step of
displaying a distribution of measurement values of each of said parameters for said plurality of objects in the form of a histogram.

13. A non-transitory storage medium readable by a computer and having stored therein an image processing program for classifying an object included in an image corresponding to a cell as adopted or as not adopted, said image processing program causing said computer to perform the steps of:
a) extracting a plurality of objects corresponding to cells from an image;
b) determining that an object having parameters within allowable ranges is adopted and that an object having at least one of said parameters outside a corresponding one of said allowable ranges is not adopted among said plurality of objects;

c) displaying the object adopted and the object not adopted in said step b) in a distinguishable manner;
d) accepting the designation of an object whose adoption/non-adoption result is desired to be reversed among the objects displayed in said step c); and
e) changing one of said allowable ranges so that the adoption/non-adoption result of the object designated in said step d) is reversed;

wherein the computer automatically selects a parameter from a plurality of different parameters with an allowable range to be changed, to change the allowable range of the parameter in said step e) by reference to the values of said parameters of the object designated in said step d), when an object the adoption/non-adoption result of which is desired to be reversed from "not adopted" to "adopted" is designated in said step d), the computer automatically selects the parameter that is outside the allowable range from a plurality of different parameters, and changes the allowable range of the selected parameter so that the selected parameter falls within the allowable range in said step e), and stores the changed allowable range, and when an object the adoption/non-adoption result of which is desired to be reversed from "adopted" to "not adopted" is designated in said step d), the computer automatically selects the parameter that is closest to the upper limit or the lower limit of its allowable range from a plurality of different parameters, and changes the upper or lower limit of the allowable range of the selected parameter so that the parameter value falls outside the allowable range in said step e), and stores the changed allowable range.

14. The storage medium according to claim 13, wherein
said one allowable range is changed in said step e), based on an entry made by a user in step d) so as to make the change.

15. The storage medium according to claim 14, wherein
said image processing program causes said computer to further perform the step of
f) displaying the values of said parameters for the object designated in said step d), said step f) being performed before said step e).

16. The storage medium according to claim 15, wherein
which parameter is outside a corresponding one of said allowable ranges is further displayed in said step f), when the object designated in said step d) is an object not adopted.

17. The storage medium according to claim 13, wherein
said image processing program causes said computer to further perform the step of
displaying a distribution of measurement values of each of said parameters for said plurality of objects in the form of a histogram.

* * * * *